US012741725B2

(12) United States Patent
Roenigk et al.

(10) Patent No.: US 12,741,725 B2
(45) Date of Patent: Sep. 22, 2026

(54) UNDERWATER VEHICLE DYNAMICS MODELING ENHANCED NAVIGATION WITH RELEASABLE TRAINING SYSTEM

(71) Applicant: Honeywell International Inc., Charlotte, NC (US)

(72) Inventors: Karl Roenigk, Ellicott City, MD (US); Sally Ann Keyes-Edwards, Issaquah, WA (US)

(73) Assignee: Honeywell Aerospace US LLC, Phoenix, AZ (US)

( * ) Notice: Subject to any disclaimer, the term of this patent is extended or adjusted under 35 U.S.C. 154(b) by 97 days.

(21) Appl. No.: 18/618,803

(22) Filed: Mar. 27, 2024

(65) Prior Publication Data

US 2025/0074558 A1 Mar. 6, 2025

Related U.S. Application Data

(60) Provisional application No. 63/580,914, filed on Sep. 6, 2023.

(51) Int. Cl.

| | |
|---|---|
| ***B63B 79/20*** | (2020.01) |
| ***B63B 79/40*** | (2020.01) |
| ***G01C 21/20*** | (2006.01) |

(52) U.S. Cl.

CPC .............. *B63B 79/20* (2020.01); *B63B 79/40* (2020.01); *G01C 21/203* (2013.01); *B63B 2213/02* (2013.01)

(58) Field of Classification Search

CPC ..... B63B 79/40; B63B 79/20; B63B 2213/02; B63G 2008/004; B63G 8/001; G01C 21/203

See application file for complete search history.

(56) References Cited

U.S. PATENT DOCUMENTS

| | | | | |
|---|---|---|---|---|
| 5,640,325 A * | 6/1997 | Banbrook | ............ | G01C 21/188 701/505 |
| 9,103,937 B2 * | 8/2015 | Rikoski | ............... | G01S 7/52003 |

(Continued)

FOREIGN PATENT DOCUMENTS

| | | | |
|---|---|---|---|
| AU | 2011314056 A1 * | 3/2013 | ........... G01C 21/203 |
| CN | 103017755 B | 1/2016 | |

(Continued)

OTHER PUBLICATIONS

He, QinYuan, HuaPeng Yu, and YuChen Fang. "Deep learning-based inertial navigation technology for autonomous underwater vehicle long-distance navigation—a review." Gyroscopy and Navigation 14.3 (2023): 267-275. (Year: 2023).*

(Continued)

*Primary Examiner* — Cuong H Nguyen
(74) *Attorney, Agent, or Firm* — Fogg & Powers LLC

(57) ABSTRACT

A system comprises a vehicle platform of an underwater vehicle, and a model based navigation system for vehicle dynamics modeling navigation of the underwater vehicle. The model based navigation system comprises inertial sensors on the vehicle platform; a strapdown navigation processor that receives inertial sensor data from the inertial sensors; platform input sensors and a vehicle physics model that receives platform input measurements from the platform input sensors; a propagator-estimator filter that receives vehicle data from the vehicle physics model; and a depth sensor that determines depth measurements for the vehicle platform. A tethered platform is releasably coupled to the vehicle platform and communicates with the model based navigation system. The tethered platform comprises an aiding source that determines position and velocity measurements that are transmitted to the propagator-estimator filter. A navigation solution from the strapdown navigation (Continued)

processor is sent to a vehicle control system for navigating the vehicle platform.

18 Claims, 3 Drawing Sheets

(56) References Cited

U.S. PATENT DOCUMENTS

| | | | | |
|---|---|---|---|---|
| 9,120,544 | B2 * | 9/2015 | Licht | B63G 8/001 |
| 11,790,793 | B2 | 10/2023 | Keyes et al. | |
| 2008/0029015 | A1 | 2/2008 | Amidon | |
| 2011/0282536 | A1 * | 11/2011 | Rooney, III | G05D 1/027 901/1 |
| 2013/0233232 | A1 | 9/2013 | Crowell et al. | |
| 2014/0331910 | A1 * | 11/2014 | Licht | B63G 8/001 114/322 |
| 2015/0346726 | A1 | 12/2015 | Davoodi et al. | |
| 2016/0349026 | A1 | 12/2016 | Fairfax et al. | |
| 2020/0055570 | A1 | 2/2020 | Brink et al. | |
| 2024/0069058 | A1 * | 2/2024 | Rider | G01P 5/02 |
| 2024/0210171 | A1 * | 6/2024 | Pastor | G01V 1/3817 |

FOREIGN PATENT DOCUMENTS

| | | | | |
|---|---|---|---|---|
| CN | 116337115 | A | 6/2023 | |
| EP | 1440289 | A1 | 1/2008 | |
| EP | 1908682 | A1 * | 4/2008 | G01S 5/22 |
| IN | 202241045253 | | 6/2023 | |
| KR | 100652914 | | 12/2006 | |
| KR | 101529378 | B1 * | 6/2015 | G01M 5/0066 |
| WO | WO-2023132752 | A1 * | 7/2023 | G05D 1/43 |

OTHER PUBLICATIONS

Wang, Xuan, et al. "SdoNet: Speed odometry network and noise adapter for vehicle integrated navigation." IEEE Internet of Things Journal 10.21 (2023): 19328-19343. (Year: 2023).*

Edwards, Sarah. Visual Localisation for Pipe Inspection Robots using Prior Information of the Environment. Diss. University of Sheffield, 2023. (Year: 2023).*

Hegrenaes et al., "Model-Aided Inertial Navigation for Underwater Vehicles", Proceedings of the IEEE International Conference on Robotics and Automation, Pasadena, 2008, pp. 1 through 8.

Australian Government IP Australia, "Examination report No. 1 for standard patent application", dated Dec. 13, 2025, from AU Application No. 2024205798, from Foreign Counterpart to U.S. Appl. No. 18/618,803, pp. 1 through 7, Published: AU.

Hegrenaes et al., "Model-Aided INS with Sea Current Estimation for Robust Underwater Navigation", IEEE Journal of Oceanic Engineering, vol. 36, No. 2, Apr. 2011, pp. 316 through 337.

Australian Government Ip Australia, "Examination report No. 2 for standard patent application", dated Jun. 22, 2026, from AU Application No. 2024205798, from Foreign Counterpart to U.S. Appl. No. 18/618,803, pp. 1 through 6, Published: AU.

* cited by examiner

UNDERWATER VEHICLE DYNAMICS MODELING ENHANCED NAVIGATION WITH RELEASABLE TRAINING SYSTEM

CROSS REFERENCE TO RELATED APPLICATION

This application claims the benefit of and priority to U.S. Provisional Application No. 63/580,914, filed on Sep. 6, 2023, the disclosure of which is herein incorporated by reference.

BACKGROUND

A method that employs machine learning (or classical system identification techniques) to model airborne platform dynamics and enhance an overall navigation solution, is known as vehicle dynamics modeling (VDM) navigation aiding. This method relies on temporary training of the machine learning in-flight using a high accuracy ground truth system such as the Global Positioning System (GPS). The temporary training allows for estimating the vehicle dynamics model parameter settings before the airborne platform enters an environment deprived of GPS ground truth, where instead, alternative navigation capabilities and supporting sensors would be needed. The machine learning enhanced, vehicle dynamics modeling navigation solution provides higher accuracy and in some cases error bounds.

There is a need for a similar capability as provided by VDM navigation aiding for use with underwater platforms that are denied Global Navigation Satellite System (GNSS) signals such as GPS signals.

SUMMARY

A system comprises a vehicle platform of an underwater vehicle, and a model based navigation system for vehicle dynamics modeling navigation of the underwater vehicle. The model based navigation system comprises a set of inertial sensors coupled to the vehicle platform, with the inertial sensors configured to generate inertial sensor data for the vehicle platform; and at least one processor including a strapdown navigation processor that is operative to receive the inertial sensor data from the inertial sensors. The strapdown navigation processor hosts a navigation and sea state model, and a navigation solution is computed by the strapdown navigation processor. A set of platform input sensors are configured to receive platform input data for the vehicle platform, and the platform input sensors are operative to generate platform input measurements that are indicative of forces acting on the vehicle platform. A vehicle physics model is configured to receive the platform input measurements from the platform input sensors, and the vehicle physics model is operative to perform calculations utilizing dynamics equations for a rigid body corresponding to the vehicle platform. A propagator-estimator filter is configured to receive vehicle data output from the vehicle physics model, and the propagator-estimator filter is operative to compute navigation corrections that are sent the strapdown navigation processor in a feedback arrangement. At least one depth sensor is configured to determine depth measurements for the vehicle platform, and the propagator-estimator filter is configured to receive the depth measurements from the at least one depth sensor. A tethered platform is releasably coupled to the vehicle platform and in operative communication with the model based navigation system. The tethered platform comprises at least one aiding source configured to determine position and velocity measurements that are transmitted to the model based navigation system for processing in the propagator-estimator filter. The navigation solution computed by the strapdown navigation processor is sent to a vehicle control system for use in navigating the vehicle platform.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
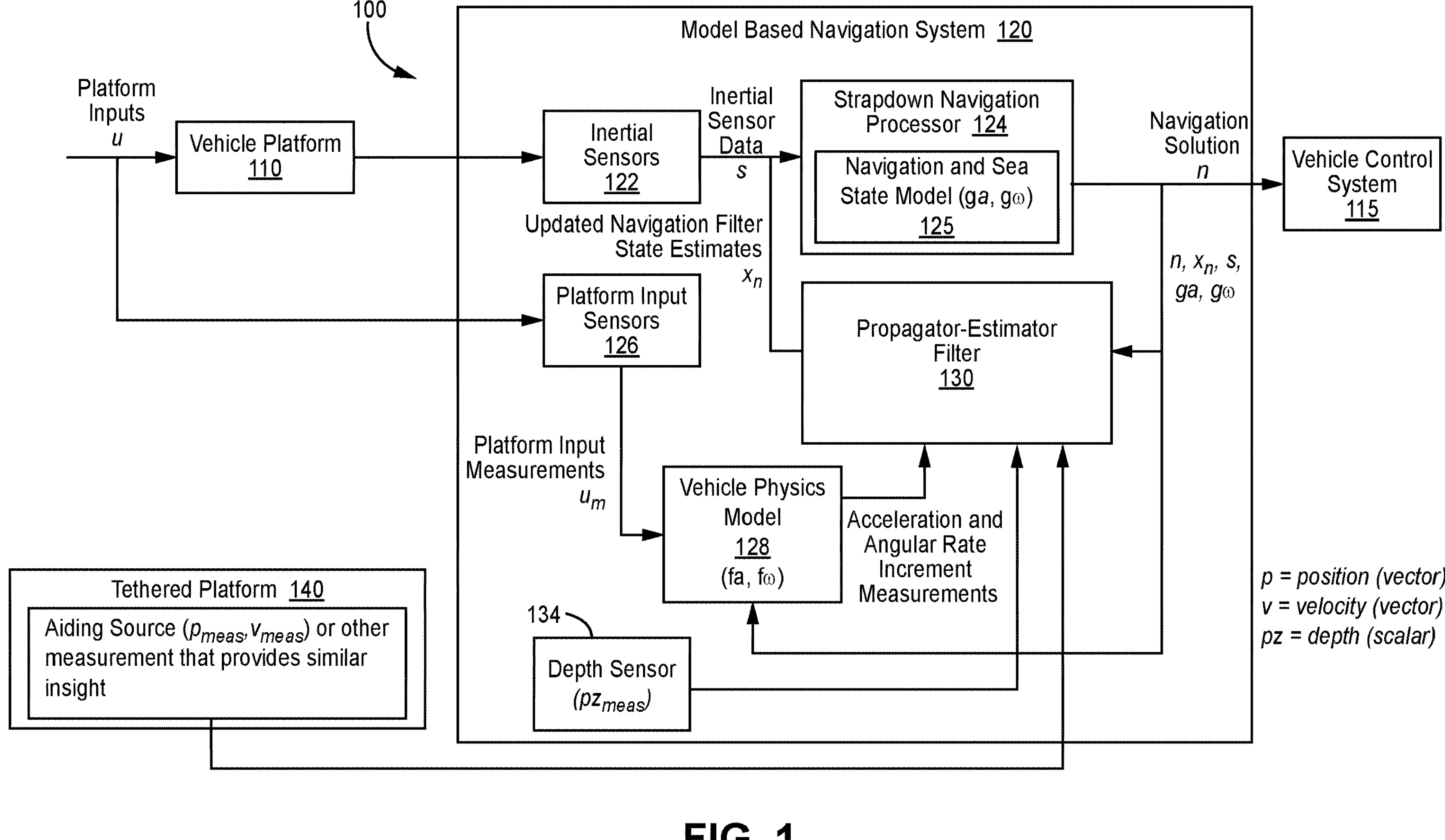
FIG. 1 is a block diagram of a system for underwater vehicle dynamics modeling navigation, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for underwater vehicle dynamics modeling enhanced navigation with a releasable training system, is described herein. The present approach is useful for underwater platforms that are denied Global Navigation Satellite System (GNSS) signals, such as Global Positioning System (GPS) signals.

It should be understood that the phrase "machine learning" as used herein can be replaced with any classical system identification technique or modeling technique, and still remain within the scope of the present disclosure.

In general, the present approach provides an underwater vehicle with surface information to enable the underwater vehicle to learn its dynamic model and/or a sea state. In this context, the "sea state" encompasses information about ocean currents such as average speed and direction, or can be more complex models of current as a function of latitude, longitude, and depth. A surface vehicle is coupled to the underwater vehicle with a tether. The surface vehicle computes its navigation solution and transmits this information to the underwater vehicle through the tether. The underwater vehicle includes a vehicle dynamics modeling (VDM) navigation system that has training algorithms, which learn and refine an underwater vehicle dynamic model and/or a sea state model using the received surface information.

To extend vehicle dynamics modeling (VDM) for use with underwater platforms, a training system is provided that enables temporal transmission of precise ground truth information on position and vehicle state to an underwater vehicle, which enables accurate training of supporting machine learning, via sensor information collected at the surface. The training system is designed so that collection and transmission of information is achieved in a fashion that minimizes any added drag forces on the underwater vehicle that may affect how the vehicle or sea state is modelled by the machine learning. The training can be accomplished in the field before the underwater platform is released from a training system tether to run freely along its planned course for an operation, either crewed or uncrewed, and to navigate with enhanced precision. The time required for training in the field will depend on a number of factors, including the level of model pretraining performed prior to deploying the system.

Navigation with and without the tethered system may be supplemented by available onboard alternative-navigation sensors used by a Kalman filter or other position estimation algorithms. Additional sensors may include, but are not limited to, depth sensors and doppler velocity logs. The machine learning enhanced VDM navigation solution provides higher accuracy than an inertial only navigation solution, as well as error bounds, for many classes of inertial sensors. The present system can significantly enhance underwater navigation, permitting longer range and duration operations with higher precision navigation, and permitting operations with higher degrees of risk.

The present approach also provides a user with the ability to employ lower cost and potentially lower size, weight and power sensors and solutions in an integrated navigation system. The present method uniquely exploits machine learning to enhance a navigation solution, and the training system permits use of VDM capability for underwater platforms, allowing for precise underwater navigation operations.

In various embodiments, the present approach minimizes drag forces that may be experienced by a subject vehicle from the tethered vehicle or vehicles that enable the machine learning enhanced VDM navigation solution. Thus, one embodiment may employ a top surface floating system attached to a lower motorized system that closely tracks the subject vehicle at a short distance, similar to a remora that follows a symbiotic partner. For example, the top surface floating system can be attached by tether to a remora, and the remora is attached to the subject vehicle, to minimize any drag forces added to the vehicle. The drag forces from the top surface floating system then become less of a design concern by this approach.

Alternatively, a top surface floating system can be used without a remora, in which case a longer tether is needed. In this embodiment, the top surface floating system can be motorized to track and follow the underwater vehicle to minimize drag on the tether. The tether in any case should be designed to minimize drag.

The surface sensor information can be transmitted from the top surface floating system down directly to the underwater vehicle, or first to the remora, which may have added functions other than to merely track the vehicle and keep the tether in a certain festooned arc so as to minimize drag. While the remora can be used to maintain low drag, the remora may also be used to measure vehicle states more precisely (e.g., position, inclination, rates of change, etc.) together with surface location information, which measurements are needed in the training algorithms. When training is sufficiently proven complete and accurate, the vehicle can be released from the tether to conduct its underwater operation.

Alternatively, the vehicle can be trained ahead of time before an operational launch in an off-line fashion for later operational use, potentially in a more controlled underwater environment.

After release, the training system, which is reusable, can be retrieved on a separate tether or line from the top surface system to a separate arbitrary surface vessel or construction.

Further details of various embodiments are described hereafter and with reference to the drawings.

The following variable definitions are used in the description of VDM aided navigation hereafter:

$u$—platform inputs (e.g., control surfaces, revolutions per minute (RPM) values, ocean currents);

$u_m$—measured platform inputs;

$u_n$—estimates of platform inputs from the navigation system or reported by the control system, subset of $x_n$;

$s$—inertial sensor data;

$x_n$—navigation filter states;

$n$—navigation solution;

$g_a$—function that computes estimated specific force from the navigation system information (not including vehicle model information);

$g_\omega$—function that computes estimated angular acceleration or angular rate increments from the navigation system information (not including vehicle model information);

$f_a$—function that computes estimated specific force based on the vehicle dynamic model;

$f_\omega$—function that computes estimated angular rate increments based on the vehicle dynamic model;

$pz_{meas}$—vertical position, or depth, measurement from depth sensor;

$p_{meas}$—position (latitude, longitude, depth (optional)) measured by a position aiding source (e.g., GPS sensor); and $v_{meas}$—velocity measured by a velocity aiding source (e.g., GPS sensor, doppler velocity log).

FIG. 1 is a block diagram of a system 100 for underwater vehicle dynamics modeling navigation, according to one embodiment. The system 100 generally includes a vehicle platform 110 for an underwater vehicle, which is operatively coupled with a model based navigation system 120, and a tethered platform 140, which is also operatively coupled with model based navigation system 120.

The vehicle platform 110 represents structural elements of the underwater vehicle, with platform inputs, u, representing the variables that result in the forces and moments acting on vehicle platform 110 that may influence the linear and rotational accelerations of the underwater vehicle. As such, the platform inputs include engine parameters such as throttle that result in vehicle generated propulsion forces generated either directly or indirectly from the vehicle's engines.

The model based navigation system 120 includes a set of inertial sensors 122, and at least one processor including a strapdown navigation processor 124 that is operative to receive inertial sensor data, s, output from inertial sensors 122. The strapdown navigation processor 124 hosts a navigation and sea state model 125 operative to determine predicted specific force ($g_a$) and angular rate increments ($g_\omega$) based on the inertial sensor data and navigation state estimates. A navigation solution, n, output from strapdown navigation processor 124, is sent to a vehicle control system 115 for used in navigating the underwater vehicle.

The inertial sensors 122 function to sense and measure the net accelerations (both linear and rotation) of the structural elements of vehicle platform 110 caused by the platform inputs, u, and vehicle states. The inertial sensors 122 may comprise various sets of accelerometers and gyroscopes, such as in an inertial measurement unit (IMU). The output inertial sensor data, s, can include three orthogonal specific force measurements resulting from linear acceleration forces applied to vehicle platform 110, and three orthogonal angular rate measurements resulting from rotational moments applied to vehicle platform 110.

As shown in FIG. 1, model based navigation system 120 further comprises a set of platform input sensors 126 configured to receive platform input data. The platform input sensors 126 can directly measure platform inputs, u, such as electromechanical actuator rotations/displacements that deflect control surfaces or RPM values that determine thrust from propulsion systems.

A vehicle physics model 128 is operative to receive platform input measurements, $u_m$, output from platform input sensors 126. In some embodiments, estimates of the platform inputs, $u_n$ may be provided by the vehicle control system or estimated by the navigation system. The vehicle physics model 128 is also operative to receive various navigation data parameters, such as vehicle state estimates, from strapdown navigation processor 124. The vehicle physics model 128 performs calculations utilizing dynamics equations for a rigid body corresponding to vehicle platform 110. For example, predicted acceleration forces corresponding to what inertial sensors 122 should be sensing can be estimated based on the physics model of vehicle platform 110 implemented by vehicle physics model 128. The vehicle states (which include position and velocity) are used in the dynamics equations in vehicle physics model 128 and are derived from the navigation solution, updated navigation filter state estimates, and inertial sensor data.

In addition, a propagator-estimator filter 130 is configured to receive vehicle data output from vehicle physics model 128. The propagator-estimator filter 130 is also in operative communication with strapdown navigation processor 124 in a feedback arrangement. The propagator-estimator filter 130 is operative to compute navigation corrections that are sent to strapdown navigation processor 124 in the feedback arrangement. In some embodiments, the propagator-estimator filter 130 may comprise a Kalman filter, or variant thereof such an extended Kalman filter (EKF) or unscented Kalman filter (UKF)), or can be a particle filter such as a Sequential Monte Carlo (SMC) filter.

It should be understood that the model based navigation system 120 may be comprised of one or more additional processors and memory programmed with code that when executed implement the functions of any of vehicle physics model 128 and propagator-estimator filter 130.

The vehicle physics model 128 computes sets of acceleration and angular rate increment measurements (given by the functions $f_a$ and $f_a$) as a function of updated navigation filter state estimates, $x_n$, from propagator-estimator filter 130. The acceleration and angular rate increment measurements ($a_m=f_a(x_n)$, $\Delta\omega_m=f_\omega(x_n)$) are fed into propagator-estimator filter 130 as an aiding source.

Further, model based navigation system 120 also includes at least one depth sensor 134 configured to determine depth measurements, $pz_{meas}$, for the underwater vehicle. The depth measurements are sent to propagator-estimator filter 130 for further processing. The depth sensor 134 can be a pressure sensor or an acoustic sensor. The acoustic sensor may require pairing with a bathymetry map.

A tethered platform 140 is releasably coupled to the underwater vehicle, and operatively communicates with model based navigation system 120. The tethered platform includes at least one aiding source, such as a GNSS receiver and antenna, which provides position and velocity measurements ($p_{meas}$, $v_{meas}$) or other measurements that provide similar insight. The aiding source measurements are transmitted to model based navigation system 120 by a tether for processing in propagator-estimator filter 130.

The propagator-estimator filter 130 includes a filter algorithm that is operative to filter and blend the navigation data (n, $x_n$, S, $g_a$, $g_\omega$) from strapdown navigation processor 124, the aiding data ($p_{meas}$, $v_{meas}$) from tethered platform 140, the acceleration and angular rate increment measurements ($a_m=f_a$ (n, $x_n$, s, u), $\Delta\omega_m=f_\omega$(n, $x_n$, s, u)) from vehicle physics model 128, and the depth measurements ($pz_{meas}$) from depth sensor 134. These data and measurements have varying degrees of accuracy, and in order to establish an optimal estimate of the vehicle navigation states, propagator-estimator filter 130 implements a recursive filter algorithm that estimates one or more state variables based on the above inputs.

The propagator-estimator filter 130 predicts what the values of a future set of vehicle states should be based on their present values, while considering any errors that can be normally expected in the data due to noise or equipment tolerances. The propagator-estimator filter 130 produces error state estimates based on that prediction and compares those states to the next set of measurement data it receives. Any differences between the measured data and the predictions based on the updated error states represent a deviation referred to as a residual error. If a residual is small, propagator-estimator filter 130 will attempt to correct the error by applying the residual error into its next iteration of predicted values of the navigation filter states.

The propagator-estimator filter 130 can be defined by the following equations:

$$h(x_n) = \begin{bmatrix} f_a(x_n) - g_a(x_n) \\ f_\omega(x_n) - g_\omega(x_n) \end{bmatrix},\ y = [0]$$

$$h(x_n) = \begin{bmatrix} p(x_n) - p_{meas} \\ v(x_n) - v_{meas} \end{bmatrix},\ y = [0]$$

where $f_a$ and $f_\omega$ are functions that respectively provide the estimated specific force and angular rate increments from the navigation solution; $g_a$ and $g_\omega$ are functions that respectively provide the estimated specific force and angular rate increments from the vehicle dynamic model; p and $p_{meas}$ are, respectively, the predicted position from the navigation solution and the measured position from a position aid; and v and $v_{meas}$ are, respectively, the predicted velocity from the navigation solution and the measured velocity from a velocity aid. Further, y and h are the measurement and measurement equations in standard EKF notation. Finally, the functions are written as depending on $x_n$ for simplicity, but it is understood that additional variables can enter into the functions as described previously herein. The relationship to $x_n$ is of focus for state estimation, so the additional inputs are neglected in this form of the equations.

Further details regarding vehicle dynamics modeling navigation can be found in U.S. Pat. No. 11,790,793, entitled SYSTEMS AND METHODS FOR MODEL BASED VEHICLE NAVIGATION, the disclosure of which is incorporated by reference herein.

It should be understood that the foregoing is one method of incorporating a VDM into a navigation system for aiding. There are additional methods and algorithms that can be used. Any form of VDM aiding can be configured to work with the tethered training approach described herein. An alternative example of VDM aiding includes integrating a specific force output from the VDM to form a velocity measurement. The same approach can be taken with angular rate increments to form an attitude measurement. Examples for this type of approach can be found in U.S. Patent Application Publication No. 2016/0349026, entitled METHOD AND APPARATUS FOR GPS-DENIED NAVIGATION OF SPIN-STABILIZED PROJECTILES, the disclosure of which is incorporated by reference herein; and in Hegrenaes et. al., *Model-Aided Inertial Navigation for Underwater Vehicles*, Proceedings of the IEEE International Conference on Robotics and Automation, Pasadena, pp. 1-8 (2008), the disclosure of which is incorporated by reference herein.

Figure 2:
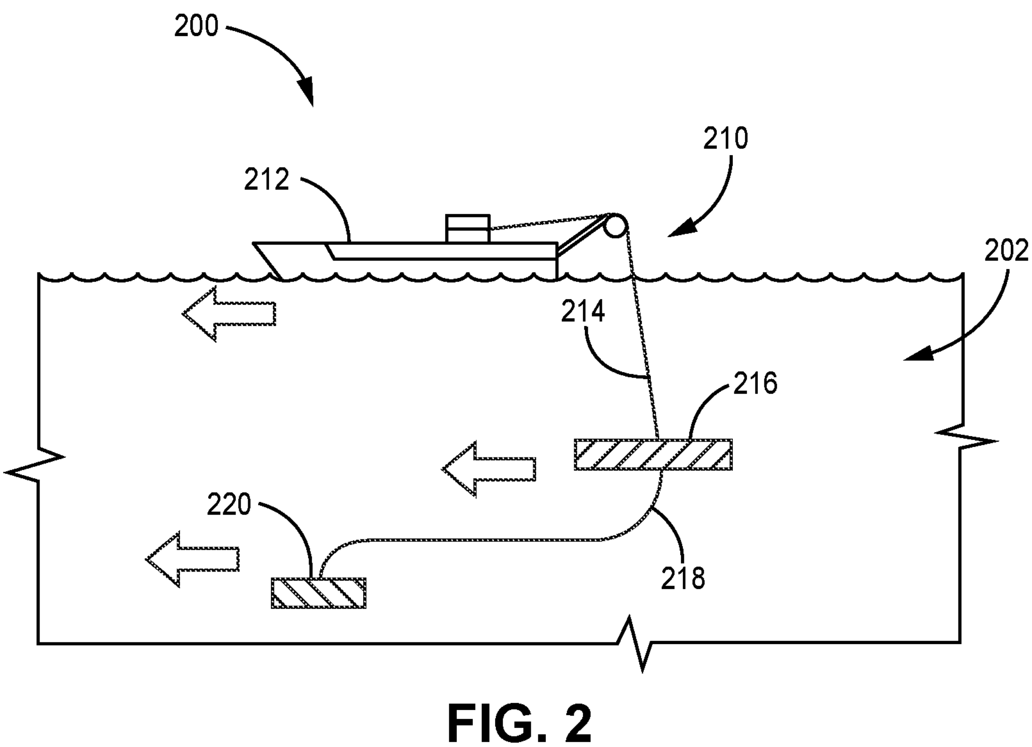
FIG. 2 is a schematic diagram of an example system for implementing the underwater vehicle dynamics modeling navigation of FIG. 1.

FIG. 2 is a schematic diagram of an example system 200 for implementing underwater vehicle dynamics modeling navigation in a body of water 202, according to the present approach. The system 200 includes a tethered platform 210 having a top surface floating apparatus 212 that is coupled by a first tether 214 to a lower underwater motorized apparatus 216 configured to track and follow an underwater vehicle 220. The lower underwater motorized apparatus 216 is releasably coupled to underwater vehicle 220 by a second tether 218. The underwater vehicle 220 includes a model based navigation system such as discussed above (see FIG. 1) that has training algorithms.

During operation of system 200, top surface floating apparatus 212 and lower underwater motorized apparatus 216 are configured to closely track and follow the movement of underwater vehicle 220. The surface sensor information is transmitted from top surface floating apparatus 212 through first tether 214 to lower underwater motorized apparatus 216, and is sent on to underwater vehicle 220 through second tether 218. The surface sensor information is used along with other vehicle measurements by the training algorithms of the model based navigation system. When the training is sufficiently complete and accurate, underwater vehicle 220 is released from second tether 218 so that underwater vehicle 220 can conduct its operation independently. For example, underwater vehicle 220 can be released from second tether 218 to conduct underwater operations when training of the model based navigation system meets a threshold level of accuracy. The threshold level of accuracy depends on requirements for a given application, but may be represented as an equivalent velocity accuracy. As an example, velocity targets may be set to be comparable to uncertainty in the ocean currents, which may be on the order of about 0.1 to 1 meter per second.

Alternatively, tethered platform 210 can have just top surface floating apparatus 212 without a lower underwater motorized apparatus, such that top surface floating apparatus 212 is coupled directly to underwater vehicle 220 with a releasable tether.

Additional embodiments may include those that distribute processing requirements to any combination of supporting vehicles. For example, in some cases it may be desirable to focus processing on a tethered remora or top-surface floating vehicles. In these cases power can be more readily available and processing capability can be made substantial without adding otherwise unneeded corresponding size, weight, power, and cost for processing to the underwater vehicle that is to employ the resulting model based navigation solution. In this way, the intensive computational processing for training of the model based navigation system can be distributed to permit the underwater vehicle to be designed and operated with minimal size, weight, power, and cost.

Figure 3:
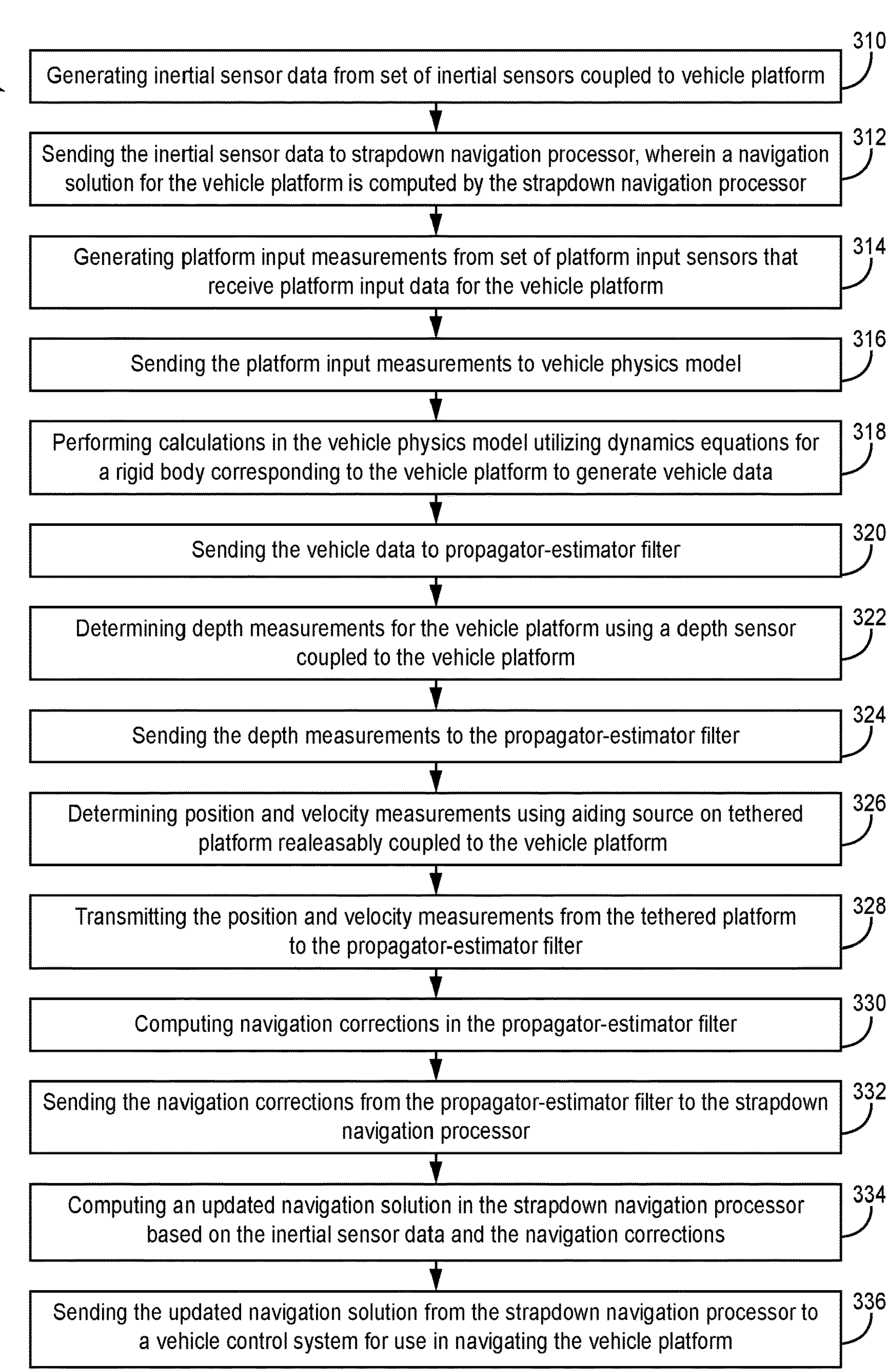
FIG. 3 is a flow diagram of a method for underwater vehicle dynamics modeling navigation, according to one implementation.

FIG. 3 is a flow diagram of a method 300 for underwater vehicle dynamics modeling navigation, according to one implementation. The method 300 can be implemented for a vehicle platform of an underwater vehicle that utilizes a model based navigation system, such as vehicle platform 110 and model based navigation system 120 (FIG. 1). The model based navigation system includes a strapdown navigation processor, a propagator-estimator filter, and a vehicle physics model, such as described previously. A tethered platform is releasably coupled to the vehicle platform, such as tethered platform 140 (FIG. 1), with the tethered platform in operative communication with the model based navigation system.

The method 300 comprises generating inertial sensor data from a set of inertial sensors coupled to the vehicle platform (block 310), and sending the inertial sensor data to the strapdown navigation processor, wherein a navigation solution for the vehicle platform is computed by the strapdown navigation processor (block 312). The method 300 further includes generating platform input measurements from a set of platform input sensors that receive platform input data for the vehicle platform (block 314). The platform input measurements are indicative of forces acting on the vehicle platform. The method 300 sends the platform input measurements to the vehicle physics model (block 316), and performs calculations in the vehicle physics model utilizing dynamics equations for a rigid body corresponding to the vehicle platform to generate vehicle data (block 318). The method 300 sends the vehicle data to the propagator-estimator filter (block 320), determines depth measurements for the vehicle platform using a depth sensor coupled to the vehicle platform (block 322), and sends the depth measurements to the propagator-estimator filter (block 324).

The method 300 also comprises determining position and velocity measurements using at least one aiding source on the tethered platform releasably coupled to the vehicle platform (block 326), and transmitting the position and velocity measurements from the tethered platform to the propagator-estimator filter (block 328). The method 300 computes navigation corrections in the propagator-estimator filter (block 330), and sends the navigation corrections from the propagator-estimator filter to the strapdown navigation processor (block 332). The method 300 then computes an updated navigation solution in the strapdown navigation processor based on the inertial sensor data and the navigation corrections (block 334), and sends the updated navigation solution from the strapdown navigation processor to a vehicle control system for use in navigating the vehicle platform (block 336).

The processing units and/or other computational devices used in the system and method described herein may be implemented using software, firmware, hardware, or appropriate combinations thereof. The processing units and/or other computational devices may be supplemented by, or incorporated in, specially-designed application-specific integrated circuits (ASICs) or field programmable gate arrays (FPGAs). In some implementations, the processing units and/or other computational devices may communicate through a transceiver with other computing devices outside of the navigation system, such as those associated with a management system or computing devices associated with other subsystems controlled by the management system. The processing units and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer or processor readable media used for storage of computer readable instructions or data structures. Such a computer readable medium may be available media that can be accessed by a general purpose or special purpose computer or processor, or any programmable logic device.

Suitable computer or processor readable storage media may include, for example, non-volatile memory devices including semi-conductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

Example Embodiments

Example 1 includes a system comprising: a vehicle platform of an underwater vehicle; a model based navigation system for vehicle dynamics modeling navigation of the underwater vehicle, the model based navigation system comprising: a set of inertial sensors coupled to the vehicle platform, the inertial sensors configured to generate inertial sensor data for the vehicle platform; at least one processor including a strapdown navigation processor that is operative to receive the inertial sensor data from the inertial sensors, the strapdown navigation processor hosting a navigation and sea state model, wherein a navigation solution is computed by the strapdown navigation processor; a set of platform input sensors that are configured to receive platform input data for the vehicle platform, the platform input sensors configured to generate platform input measurements that are indicative of forces acting on the vehicle platform; a vehicle physics model configured to receive the platform input measurements from the platform input sensors, the vehicle physics model operative to perform calculations utilizing dynamics equations for a rigid body corresponding to the vehicle platform; a propagator-estimator filter configured to receive vehicle data output from the vehicle physics model, the propagator-estimator filter operative to compute navigation corrections that are sent the strapdown navigation processor in a feedback arrangement; and at least one depth sensor configured to determine depth measurements for the vehicle platform, wherein the propagator-estimator filter is configured to receive the depth measurements from the at least one depth sensor; and a tethered platform releasably coupled to the vehicle platform and in operative communication with the model based navigation system, the tethered platform comprising: at least one aiding source configured to determine position and velocity measurements that are transmitted to the model based navigation system for processing in the propagator-estimator filter; wherein the navigation solution computed by the strapdown navigation processor is sent to a vehicle control system for use in navigating the vehicle platform.

Example 2 includes the system of Example 1, wherein the tethered platform includes a top surface floating apparatus that is attached by a tether to the vehicle platform.

Example 3 includes the system of Example 2, wherein the top surface floating apparatus is configured to track and follow the vehicle platform to minimize drag on the tether.

Example 4 includes the system of Example 1, wherein the tethered platform includes a top surface floating apparatus that is coupled by a first tether to a lower underwater motorized apparatus configured to track and follow the vehicle platform.

Example 5 includes the system of Example 4, wherein the lower underwater motorized apparatus is releasably coupled to the vehicle platform by a second tether.

Example 6 includes the system of any of Examples 1-5, wherein the at least one aiding source comprises a global navigation satellite system (GNSS) receiver.

Example 7 includes the system of any of Examples 1-6, wherein: the vehicle physics model is operative to receive vehicle state estimates from the strapdown navigation processor; and the vehicle data output from the vehicle physics model comprises acceleration and angular rate increment measurements.

Example 8 includes the system of any of Examples 1-7, wherein the propagator-estimator filter comprises a Kalman filter, an extended Kalman filter, an unscented Kalman filter, or a particle filter.

Example 9 includes the system of any of Examples 1-8, wherein the navigation corrections comprise updated navigation filter state estimates.

Example 10 includes the system of any of Examples 1-9, wherein the navigation solution computed by the strapdown navigation processor is a machine learning enhanced, vehicle dynamics modeling navigation solution.

Example 11 includes a method comprising: providing a vehicle platform of an underwater vehicle; providing a model based navigation system for vehicle dynamics modeling navigation of the underwater vehicle, the model based navigation system comprising: a strapdown navigation processor that hosts a navigation and sea state model; a propagator-estimator filter in operative communication with the strapdown navigation processor; and a vehicle physics model in operative communication with the propagator-estimator filter and the strapdown navigation processor; providing a tethered platform releasably coupled to the vehicle platform, the tethered platform in operative communication with the model based navigation system; generating inertial sensor data from a set of inertial sensors coupled to the vehicle platform; sending the inertial sensor data to the strapdown navigation processor; generating platform input measurements from a set of platform input sensors that receive platform input data for the vehicle platform, the platform input measurements indicative of forces acting on the vehicle platform; sending the platform input measurements to the vehicle physics model; performing calculations in the vehicle physics model utilizing dynamics equations for a rigid body corresponding to the vehicle platform to generate vehicle data; sending the vehicle data to the propagator-estimator filter; determining one or more depth measurements for the vehicle platform using a depth sensor coupled to the vehicle platform; sending the one or more depth measurements to the propagator-estimator filter; determining position and velocity measurements using at least one aiding source on the tethered platform; transmitting the position and velocity measurements from the tethered platform to the propagator-estimator filter; computing navigation corrections in the propagator-estimator filter; sending the navigation corrections from the propagator-estimator filter to the strapdown navigation processor; computing an updated navigation solution in the strapdown navigation processor based on the inertial sensor data and the navigation corrections; and sending the updated navigation solution from the strapdown navigation processor to a vehicle control system for use in navigating the vehicle platform.

Example 12 includes the method of Example 11, wherein the tethered platform includes a top surface floating apparatus that is attached by a tether to the vehicle platform.

Example 13 includes the method of Example 12, wherein the top surface floating apparatus is configured to track and follow the vehicle platform to minimize drag on the tether.

Example 14 includes the method of Example 11, wherein the tethered platform includes a top surface floating apparatus that is coupled by a first tether to a lower underwater motorized apparatus configured to track and follow the vehicle platform.

Example 15 includes the method of Example 14, wherein the lower underwater motorized apparatus is releasably coupled to the vehicle platform by a second tether.

Example 16 includes the method of any of Examples 11-15, wherein: the vehicle physics model receives vehicle state estimates from the strapdown navigation processor; and vehicle data output from the vehicle physics model comprises acceleration and angular rate increment measurements.

Example 17 includes the method of any of Examples 11-16, wherein the navigation corrections comprise updated navigation filter state estimates.

Example 18 includes the method of any of Examples 11-17, wherein the vehicle platform is released from the tethered platform to conduct underwater operations when training of the model based navigation system meets a threshold level of accuracy.

Example 19 includes the method of any of Examples 11-18, wherein the updated navigation solution computed by the strapdown navigation processor is a machine learning enhanced, vehicle dynamics modeling navigation solution.

Example 20 includes a program product comprising: a processor readable medium having instructions stored thereon, executable by at least one processor, to perform a method for underwater vehicle dynamics modeling navigation, the method comprising: generating inertial sensor data from a set of inertial sensors coupled to a vehicle platform; sending the inertial sensor data to a strapdown navigation processor that hosts a navigation and sea state model, wherein a navigation solution for the vehicle platform is computed by the strapdown navigation processor; generating platform input measurements from a set of platform input sensors that receive platform input data for the vehicle platform, the platform input measurements indicative of forces acting on the vehicle platform; sending the platform input measurements to a vehicle physics model; performing calculations in the vehicle physics model utilizing dynamics equations for a rigid body corresponding to the vehicle platform to generate vehicle data; sending the vehicle data to a propagator-estimator filter; determining one or more depth measurements for the vehicle platform using a depth sensor coupled to the vehicle platform; sending the one or more depth measurements to the propagator-estimator filter; determining position and velocity measurements using at least one aiding source on a tethered platform coupled to the vehicle platform; transmitting the position and velocity measurements from the tethered platform to the propagator-estimator filter; computing navigation corrections in the propagator-estimator filter; sending the navigation corrections from the propagator-estimator filter to the strapdown navigation processor; computing an updated navigation solution in the strapdown navigation processor based on the inertial sensor data and the navigation corrections; and sending the updated navigation solution from the strapdown navigation processor to a vehicle control system for use in navigating the vehicle platform.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system comprising:

a vehicle platform of an underwater vehicle;

a model based navigation system for vehicle dynamics modeling navigation of the underwater vehicle, the model based navigation system comprising:

a set of inertial sensors coupled to the vehicle platform, the inertial sensors configured to generate inertial sensor data for the vehicle platform;

at least one processor including a strapdown navigation processor that is operative to receive the inertial sensor data from the inertial sensors, the strapdown navigation processor hosting a navigation and sea state model, wherein a navigation solution is computed by the strapdown navigation processor;

a set of platform input sensors that are configured to receive platform input data for the vehicle platform, the platform input sensors configured to generate platform input measurements that are indicative of forces acting on the vehicle platform;

a vehicle physics model configured to receive the platform input measurements from the platform input sensors, the vehicle physics model operative to perform calculations utilizing dynamics equations for a rigid body corresponding to the vehicle platform;

a propagator-estimator filter configured to receive vehicle data output from the vehicle physics model, the propagator-estimator filter operative to compute navigation corrections that are sent the strapdown navigation processor in a feedback arrangement; and at least one depth sensor configured to determine depth measurements for the vehicle platform, wherein the propagator-estimator filter is configured to receive the depth measurements from the at least one depth sensor; and a tethered platform releasably coupled to the vehicle platform and in operative communication with the model based navigation system, the tethered platform comprising:

at least one aiding source configured to determine position and velocity measurements that are transmitted to the model based navigation system for processing in the propagator-estimator filter;

wherein the navigation solution computed by the strapdown navigation processor is sent to a vehicle control system for use in navigating the vehicle platform.

2. The system of claim 1, wherein the tethered platform includes a top surface floating apparatus that is attached by a tether to the vehicle platform.

3. The system of claim 2, wherein the top surface floating apparatus is configured to track and follow the vehicle platform to minimize drag on the tether.

4. The system of claim 1, wherein the tethered platform includes a top surface floating apparatus that is coupled by a first tether to a lower underwater motorized apparatus configured to track and follow the vehicle platform.

5. The system of claim 4, wherein the lower underwater motorized apparatus is releasably coupled to the vehicle platform by a second tether.

6. The system of claim 1, wherein the at least one aiding source comprises a global navigation satellite system (GNSS) receiver.

7. The system of claim 1, wherein:

the vehicle physics model is operative to receive vehicle state estimates from the strapdown navigation processor; and the vehicle data output from the vehicle physics model comprises acceleration and angular rate increment measurements.

8. The system of claim 1, wherein the propagator-estimator filter comprises a Kalman filter, an extended Kalman filter, an unscented Kalman filter, or a particle filter.

9. The system of claim 1, wherein the navigation corrections comprise updated navigation filter state estimates.

10. A program product comprising:

a processor readable medium having instructions stored thereon, executable by at least one processor, to perform a method comprising:

providing a model based navigation system for vehicle dynamics modeling navigation of an underwater vehicle, the model based navigation system comprising a strapdown navigation processor that hosts a navigation and sea state model, a propagator-estimator filter; and a vehicle physics model;

generating inertial sensor data from a set of inertial sensors coupled to a vehicle platform of the underwater vehicle;

sending the inertial sensor data to the strapdown navigation processor, wherein a navigation solution for the vehicle platform is computed by the strapdown navigation processor;

generating platform input measurements from a set of platform input sensors that receive platform input data for the vehicle platform, the platform input measurements indicative of forces acting on the vehicle platform;

sending the platform input measurements to the vehicle physics model;

performing calculations in the vehicle physics model utilizing dynamics equations for a rigid body corresponding to the vehicle platform to generate vehicle data;

sending the vehicle data to the propagator-estimator filter;

determining one or more depth measurements for the vehicle platform using a depth sensor coupled to the vehicle platform;

sending the one or more depth measurements to the propagator-estimator filter;

determining position and velocity measurements using at least one aiding source on a tethered platform coupled to the vehicle platform;

transmitting the position and velocity measurements from the tethered platform to the propagator-estimator filter;

computing navigation corrections in the propagator-estimator filter;

sending the navigation corrections from the propagator-estimator filter to the strapdown navigation processor;

computing an updated navigation solution in the strapdown navigation processor based on the inertial sensor data and the navigation corrections; and sending the updated navigation solution from the strapdown navigation processor to a vehicle control system for use in navigating the vehicle platform.

11. A method comprising:

providing a vehicle platform of an underwater vehicle;

providing a model based navigation system for vehicle dynamics modeling navigation of the underwater vehicle, the model based navigation system comprising:

a strapdown navigation processor that hosts a navigation and sea state model;

a propagator-estimator filter in operative communication with the strapdown navigation processor; and a vehicle physics model in operative communication with the propagator-estimator filter and the strapdown navigation processor;

providing a tethered platform releasably coupled to the vehicle platform, the tethered platform in operative communication with the model based navigation system;

generating inertial sensor data from a set of inertial sensors coupled to the vehicle platform;

sending the inertial sensor data to the strapdown navigation processor;

generating platform input measurements from a set of platform input sensors that receive platform input data for the vehicle platform, the platform input measurements indicative of forces acting on the vehicle platform;

sending the platform input measurements to the vehicle physics model;

performing calculations in the vehicle physics model utilizing dynamics equations for a rigid body corresponding to the vehicle platform to generate vehicle data;

sending the vehicle data to the propagator-estimator filter;

determining one or more depth measurements for the vehicle platform using a depth sensor coupled to the vehicle platform;

sending the one or more depth measurements to the propagator-estimator filter;

determining position and velocity measurements using at least one aiding source on the tethered platform;

transmitting the position and velocity measurements from the tethered platform to the propagator-estimator filter;

computing navigation corrections in the propagator-estimator filter;

sending the navigation corrections from the propagator-estimator filter to the strapdown navigation processor;

computing an updated navigation solution in the strapdown navigation processor based on the inertial sensor data and the navigation corrections; and sending the updated navigation solution from the strapdown navigation processor to a vehicle control system for use in navigating the vehicle platform.

12. The method of claim 11, wherein the tethered platform includes a top surface floating apparatus that is attached by a tether to the vehicle platform.

13. The method of claim 12, wherein the top surface floating apparatus is configured to track and follow the vehicle platform to minimize drag on the tether.

14. The method of claim 11, wherein the tethered platform includes a top surface floating apparatus that is coupled by a first tether to a lower underwater motorized apparatus configured to track and follow the vehicle platform.

15. The method of claim 14, wherein the lower underwater motorized apparatus is releasably coupled to the vehicle platform by a second tether.

16. The method of claim 11, wherein:

the vehicle physics model receives vehicle state estimates from the strapdown navigation processor; and vehicle data output from the vehicle physics model comprises acceleration and angular rate increment measurements.

17. The method of claim 11, wherein the navigation corrections comprise updated navigation filter state estimates.

18. The method of claim 11, wherein the vehicle platform is released from the tethered platform to conduct underwater operations when training of the model based navigation system meets a threshold level of accuracy.

* * * * *